F. WIARD.
LOCK FOR CUTTING TOOL PILOTS.
APPLICATION FILED AUG. 23, 1919.

1,375,339. Patented Apr. 19, 1921.

Inventor
F. Wiard
By Edward N. Pagelsen,
Attorney

UNITED STATES PATENT OFFICE.

FREDERICK WIARD, OF DETROIT, MICHIGAN, ASSIGNOR TO AMERICAN STANDARD TOOL COMPANY, OF DETROIT, MICHIGAN, A CORPORATION OF MICHIGAN.

LOCK FOR CUTTING TOOL-PILOTS.

1,375,339.  Specification of Letters Patent.  Patented Apr. 19, 1921.

Application filed August 23, 1919. Serial No. 319,323.

*To all whom it may concern:*

Be it known that I, FREDERICK WIARD, a citizen of the United States, and residing at Detroit, in the county of Wayne and State of Michigan, have invented a new and Improved Lock for Cutting Tool-Pilots, of which the following is a specification.

This invention relates to means for securing in place the pilots of counter-boring tools, and mills, reamers and other rotatable cutting tools, and its object is to provide a locking device which will permit the use of interchangeable pilots.

Figure 1:
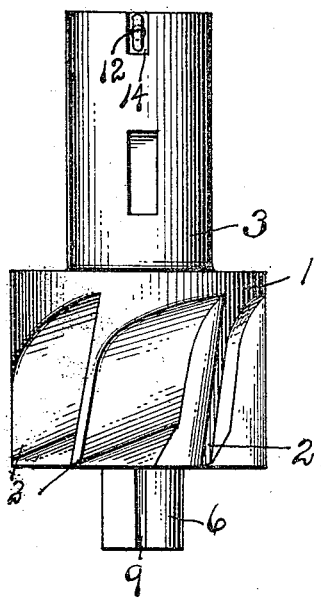
Figure 3:
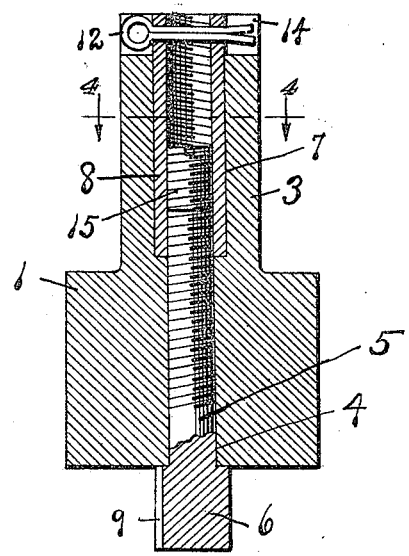
Figure 2:
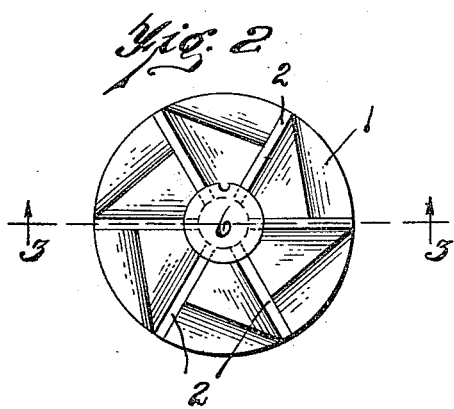
Figure 4:
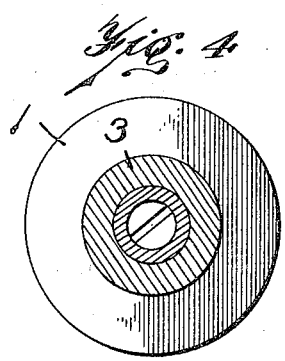

In the accompanying drawings, Figure 1 is an elevation of a cutter of the end mill type. Fig. 2 is an end view thereof. Fig. 3 is a section on the line 3—3 of Fig. 2. Fig. 4 is a section on the line 4—4 of Fig. 3.

Similar reference characters refer to like parts throughout the several views.

Tools to finish faces around holes in metal articles and to counterbore holes are usually provided with pilots which fit the already drilled holes and thus guide the tool. The same cutting tool may be used with pilots of various sizes and the same pilot may be used with counterbores of different diameters.

In the drawing a cutting tool 1 of the end-mill type has cutting teeth 2 and a shank 3. A smooth central hole of two different diameters extends through the tool, the lower end 4 of the hole being of proper size to slidably receive the stem 5 for the pilot 6, while the upper end 7 receives the sleeve 8 which is screwed tightly onto the stem 5. The pilot is preferably formed with an oil groove 9.

Any desired pilot may be mounted in a cutting tool so long as its stem will fit and extend through the smaller portion of the hole and into the sleeve 8 which may be screwed down and prevent the pilot from turning in the tool by reason of the pin 12 in the notches 14, which pin prevents the sleeve and stem from turning in the tool. As the tool usually turns right-handed, the stem 5 is threaded right-handed and will tend to screw up into the sleeve 8, and lock the parts together. If desired, a screw plug 15 may be turned down into contact with the end of the stem 5 to jam it and lock it from turning. This construction therefore necessitates only very short stems for the pilots and therefore saves the very expensive tool steel that is employed for their manufacture. The stems being short are less liable to break because of the twisting stresses to which they are subjected.

The details and proportions of this mechanism will be adapted by those skilled in the art to the various cutting tools with which pilots are to be used.

I claim:—

1. A tool of the character described comprising a body having cutting teeth formed thereon and a shank, said tool having a central hole extending its entire length and of two different diameters, that portion of the hole in the shank being greater than that in the body, a pilot and a threaded stem therefor extending through the smaller portion of the hole in the tool and into the larger portion, a tubular nut in the larger portion of the hole screwed onto said threaded stem of the pilot, a jamb screw within said nut in contact with the end of said stem, and means to prevent the nut from turning in the shank of said tool said jam screw being removable independently of the pilot.

2. A tool of the character described comprising a body having cutting teeth formed thereon and a shank, said tool having a central hole extending its entire length and of two different diameters, that portion of the hole in the shank being greater than that in the body, a pilot and a threaded stem therefor extending through the smaller portion of the hole in the tool and into the larger portion, a tubular nut in the larger portion of the hole screwed onto said threaded stem of the pilot, and a jam screw within said nut in contact with the end of said stem.

FREDERICK WIARD.